United States Patent
Lin et al.

(10) Patent No.: US 11,644,711 B2
(45) Date of Patent: May 9, 2023

(54) COLOR FILTER, DISPLAY PANEL AND DISPLAY DEVICE

(71) Applicant: JRD Communication (Shenzhen) LTD., Guangdong (CN)

(72) Inventors: Ke Lin, Guangdong (CN); Zhuwei Qiu, Guangdong (CN); Yafang Xi, Guangdong (CN); Panwei Xiong, Guangdong (CN)

(73) Assignee: JRD Communication (Shenzhen) LTD., Shenzhen (CN)

( * ) Notice: Subject to any disclaimer, the term of this patent is extended or adjusted under 35 U.S.C. 154(b) by 0 days.

(21) Appl. No.: 17/337,467

(22) Filed: Jun. 3, 2021

(65) Prior Publication Data

US 2022/0252933 A1 Aug. 11, 2022

(30) Foreign Application Priority Data

Feb. 8, 2021 (CN) .......................... 202110179947.3

(51) Int. Cl.
*G02F 1/1335* (2006.01)

(52) U.S. Cl.
CPC .. *G02F 1/133514* (2013.01); *G02F 1/133512* (2013.01); *G02F 1/133553* (2013.01); *G02F 2203/02* (2013.01)

(58) Field of Classification Search
CPC ........... G02F 1/133514; G02F 2203/02; G02F 1/133512; G02F 1/133553
USPC ........................................................ 349/106
See application file for complete search history.

(56) References Cited

U.S. PATENT DOCUMENTS

| 10,274,778 B2 | 4/2019 | Wu | |
| 2004/0233359 A1* | 11/2004 | Nam | G02F 1/133555 349/114 |
| 2004/0239848 A1* | 12/2004 | Yeh | G02F 1/133555 349/114 |
| 2014/0055703 A1* | 2/2014 | Gu | G02B 6/0085 362/607 |
| 2014/0085578 A1* | 3/2014 | Gu | G02F 1/133514 359/275 |

FOREIGN PATENT DOCUMENTS

| CN | 101008738 | 8/2007 |
| CN | 102654593 | 9/2012 |

(Continued)

OTHER PUBLICATIONS

European Search Report and the European Search Opinion dated Aug. 9, 2021 From the European Patent Office Re. Application No. 21162773.2. (11 Pages).

(Continued)

*Primary Examiner* — Edward J Glick
*Assistant Examiner* — William D Peterson

(57) ABSTRACT

A color filter, a display panel, and a display device are provided. The color filter includes a substrate, a plurality of color resistors, and a color blocking layer. The plurality of color resistors are arranged in a matrix on the substrate. Two adjacent color resistors have an interval in-between. The color blocking layer is placed in the interval. A transparent structure is placed on each of the color resistors. This could reduce the transmission loss of the light and thus raises the incident/outgoing light efficiency.

20 Claims, 4 Drawing Sheets

(56) References Cited

FOREIGN PATENT DOCUMENTS

| CN | 103777399 | 5/2014 |
| CN | 104698672 | 6/2015 |
| CN | 208141087 | 11/2018 |
| CN | 108957834 | 12/2018 |
| CN | 110058447 | 7/2019 |
| KR | 10-2005-0015026 | 2/2005 |

OTHER PUBLICATIONS

Notification of Office Action and Search Report dated Mar. 8, 2022 From the State Intellectual Property Office of the People's Republic of China Re. Application No. 202110179947.3 and Its Translation of Office Action Into English. (15 Pages).

\* cited by examiner

COLOR FILTER, DISPLAY PANEL AND DISPLAY DEVICE

CROSS REFERENCE

This application claims the priority of Chinese Patent Application No. 202110179947.3, entitled "COLOR FILTER, DISPLAY PANEL AND DISPLAY DEVICE", filed on Feb. 8, 2021, the disclosure of which is incorporated herein by reference in its entirety.

FIELD OF THE INVENTION

The present invention relates to a display technology, and more particularly, to a color filter, a display panel and a display device.

BACKGROUND

Cell phones and laptops are the electronic equipments in our daily life. The electronic equipments often have a display, such as LCD or AMOLED display. The LCD or AMOLED displays needs a backlight module or a self-eliminating light source to provide light. However, the blue light portion of the light source may damage human eyes. To solve this issue, an RLCD that does not need the backlight module or the self-eliminating light source. The RLCD has a coated reflection layer inside the display. The reflection layer could absorb and reflect ambient light for lighting purposes. Due to the structure limitation, the ambient light needs to pass through multiple stacked layers, including a polarizer, a color filter layer and a liquid crystal layer and each of the layers may result in loss of light.

SUMMARY

One objective of an embodiment of the present invention is to provide a color filter that could reduce the loss of light and raise the incoming and outgoing light rates.

According to an embodiment of the present invention, a color filter is disclosed. The color filter comprises a substrate, a plurality of color resistors, and a color blocking layer. The plurality of color resistors are arranged in a matrix on the substrate. Two adjacent color resistors have an interval in-between. The color blocking layer is placed in the interval. A transparent structure is placed on each of the color resistors.

In the color filter of the present disclosure, the transparent structure comprises a via on the color filters, the via is formed by opening at least one hole on the color resistor from a side close to the substrate, and the via extends along a direction of the substrate and pass through the color resistor.

In the color filter of the present disclosure, the via comprises a plurality of sub-vias, periodically positioned along a predetermined direction on the color resistor.

In the color filter of the present disclosure, the color resistor comprises a center region and a non-center region; and a diameter of a sub-via in the center region is greater than a diameter of a sub-via in the non-center region.

In the color filter of the present disclosure, the transparent structure comprises a first blind via positioned on the color resistor, the first blind via is formed by opening a hole on the color resistor from a side away from the substrate, and the first blind via extends along a direction of the substrate.

In the color filter of the present disclosure, the transparent structure further comprises a second blind via, the second blind via is formed by opening a hole on the color resistor from a side close to the substrate, and the second blind via extends along a direction away from the substrate.

In the color filter of the present disclosure, the first blind via and the second blind via are coaxial and a sum of a first depth of the first blind via and a second depth of the second blind via is less than a thickness of the color filter.

In the color filter of the present disclosure, the first blind via and the second blind via are dislocated to each other, and a first depth of the first blind via and a second depth of the second blind via are both greater than half of a thickness of the color filter.

According to an embodiment of the present invention, a display panel is disclosed. The display panel comprises: a display substrate; a reflection layer; a liquid crystal layer; the above-mentioned color filter; and a polarizer, wherein the display substrate, the reflection layer, the liquid crystal layer, the color filter and the polarizer are stacked from the bottom top.

According to an embodiment of the present invention, a display device is disclosed. The display device comprises: a shell; and the above-mentioned display; wherein the display panel is positioned on the shell.

According to an embodiment of the present invention, a color filter comprises a substrate, color resistors, and a light blocking layer. The color resistors are periodically arranged on the substrate and have an interval between adjacent color resistors. The light blocking layer is placed in the interval. A transparent structure is placed on each of the color resistors. This could reduce the transmission loss of the light and thus raises the incident/outgoing light efficiency.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DETAILED DESCRIPTION OF PREFERRED EMBODIMENTS

Figure 1:
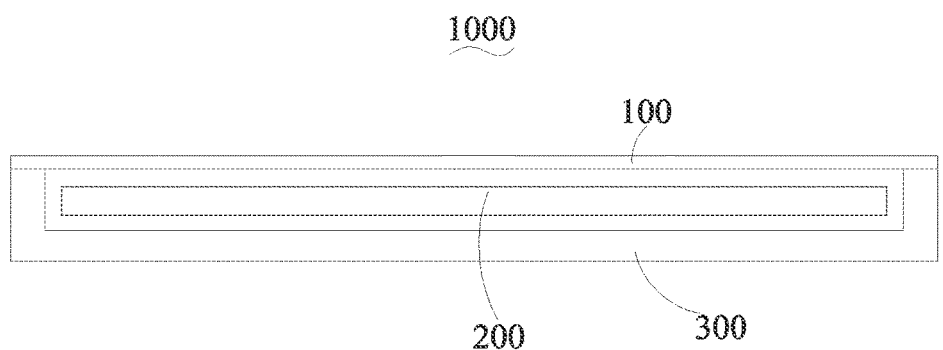
FIG. 1 is a diagram of a display device according to an embodiment of the present invention.

The invention is described below in detail with reference to the accompanying drawings, wherein like reference numerals are used to identify like elements illustrated in one or more of the figures thereof, and in which exemplary embodiments of the invention are shown. This invention may, however, be embodied in many different forms and should not be construed as limited to the particular embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

In addition, the term "first", "second" are for illustrative purposes only and are not to be construed as indicating or imposing a relative importance or implicitly indicating the number of technical features indicated. Thus, a feature that limited by "first", "second" may expressly or implicitly include at least one of the features. In the description of the present disclosure, the meaning of "plural" is two or more, unless otherwise specifically defined.

It should be understood that, when an element or layer is referred to herein as being "disposed on", "connected to" or "coupled to" another element or layer, it can be directly disposed on, connected or coupled to the other element or layer, or alternatively, that intervening elements or layers may be present. In contrast, when an element is referred to as being "directly disposed on," "directly connected to" or "directly coupled to" another element or layer, there are no intervening elements or layers present. In the figures, like numbers refer to like elements throughout. As used herein, the term "and/or" includes any and all combinations of one or more of the associated listed items.

Different methods or examples are introduced to elaborate different structures in the embodiments of the present disclosure. To simplify the method, only specific components and devices are elaborated by the present disclosure. These embodiments are truly exemplary instead of limiting the present disclosure. Identical numbers and/or letters for reference are used repeatedly in different examples for simplification and clearance. It does not imply that the relations between the methods and/or arrangement. The methods proposed by the present disclosure provide a variety of examples with a variety of processes and materials. However, persons skilled in the art understand ordinarily that the application of other processes and/or the use of other kinds of materials are possible.

Please refer to FIG. 1. FIG. 1 is a diagram of a display device 1000 according to an embodiment of the present invention. The display device 1000 could comprise a display panel 100, a control circuit 200, and a shell 300. It should be noted that the display device 1000 shown in FIG. 1 is only an example, not a limitation of the present invention. In fact, the display device 100 could comprise more components, such as a camera, an antenna, and a fingerprint identification module. The display device 100 is placed on the shell 300.

The display panel 100 could be fixed on the shell 300. The display panel 100 and the shell 300 form a sealed space to place the control circuit 200 in it.

The shell 300 could be made with a flexible material, such as a plastic shell or a silicone shell.

The control circuit 200 is installed in the shell 300. The control circuit 200 could be a main board of the display device 1000. The control circuit 200 could integrate one, two or more of a battery, an antenna, a microphone, a speaker, an earphone port, a USB port, a camera, a distance sensor, an ambient light sensor, a receiver, and a processor.

The display panel 100 is installed in the shell 300. The display panel 100 is electrically connected to the control circuit 200 to form a display surface of the display device 1000. The display panel 100 could comprise a display region and a non-display region. The display region could be used to display images of the display device 1000 or used for a user to perform a touch control. The non-display region could be used to place other functional components.

Figure 2:
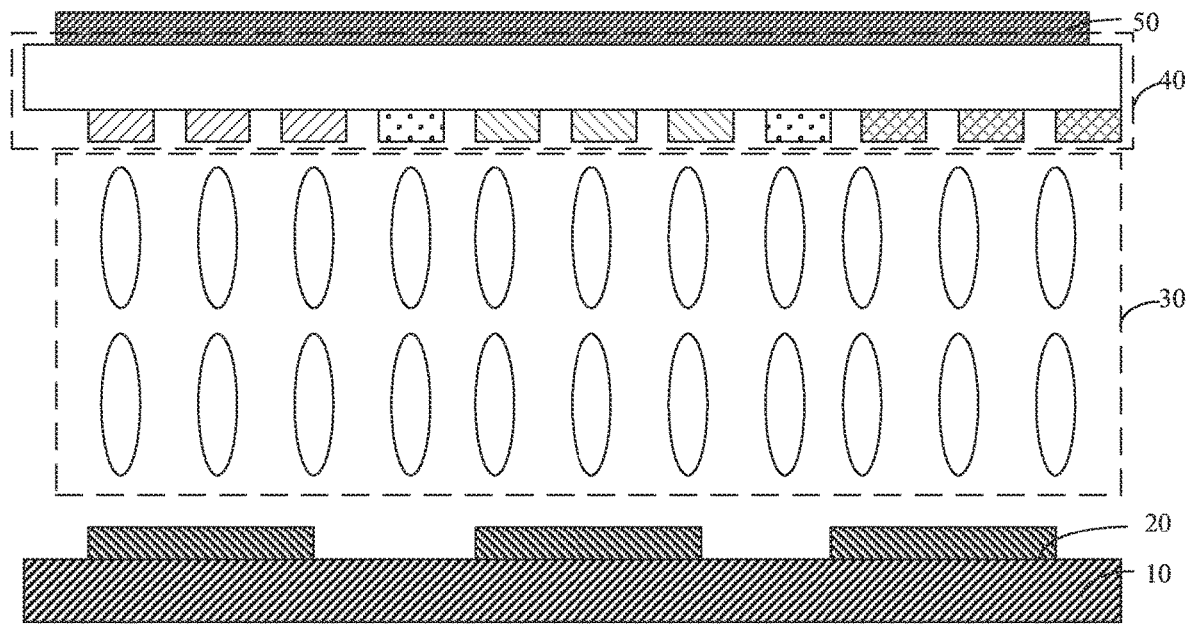
FIG. 2 is a diagram of a display panel according to an embodiment of the present invention.

Please refer to FIG. 2. FIG. 2 is a diagram of a display panel according to an embodiment of the present invention.

From the bottom top, the display panel in order comprises: a display substrate 10, a reflection layer 20, a liquid crystal layer 30, a color filter 40, and a polarizer 50.

The display substrate 10 could be a thin-film-transistor (TFT) substrate. The TFT substrate has TFTs and pixel electrodes, corresponding to each of the pixels. The TFT substrate further comprises scan lines for providing scan signals and data lines for providing data signals. The gate electrodes, source electrodes, and drain electrodes of the TFTs are respectively electrically connected to the gate lines, data lines and pixel electrodes.

Specifically, because the display substrate 10 needs to display images, the display substrate 10 further comprises a backlight module (not shown). The backlight module generates light and the light is transmitted into the light-incident surface of the light guiding plate. The light is emitted from the light-outgoing surface of the light guiding plate through reflection, refraction, and scattering, and is diffused to the external of the backlight module through a diffusion plate.

The reflection layer 20 is a functional layer for reflection LCD (RLCD). The RLCD has a coated reflection layer inside the display. The reflection layer could absorb and reflect ambient light for lighting purposes.

The liquid crystal layer 20 is used to control whether the light generated by the backlight module could be emitted or not. The liquid crystal layer 30 comprises a upper electrode plate, a lower electrode plate and a liquid crystal box between the two electrode plates. The liquid crystal box has liquid crystal molecules. When voltages are applied on the electrode plates, the liquid crystal molecules may have a change in their arrangement due to the effect of the electric field such that the outgoing light has amplitude change through the liquid crystal molecules. This change becomes more apparent under the effect of the polarizer such that the image could be displayed. Because there are a control circuit and a driving circuit in the peripheral regions of the liquid crystal material, when the electric field is generated between the electrode plates in the LCD, the liquid crystal molecules rotate such that the light is refracted by the liquid crystal molecules (due to the optical rotation of the liquid crystal molecules) and is then filtered by the polarizer 50 to be shown on the display.

Specifically, the light generated by the backlight module is often the white light. A color filter should be placed between the liquid crystal 30 and the polarizer 50 such that the display device could display light of different colors. The color filter has color resistors of different colors, such as red color resistor, blue color resistor and green color resistor. When the white light is incident into the color resistor, only the light of the color corresponding to the color resistor could be outputted. For example, the white light becomes the red light after passing through the red color resistor.

Here, because RLCD needs to use the ambient light, the ambient light needs to pass through the polarizer 50, the color filter 40, the liquid crystal layer 30 to reach the reflection layer 20. However, the light may have some loss every time when it pass through a layer. Therefore, the present invention arranges a transparent structure on a color filter 40 to reduce the loss of the ambient light.

Figure 3:
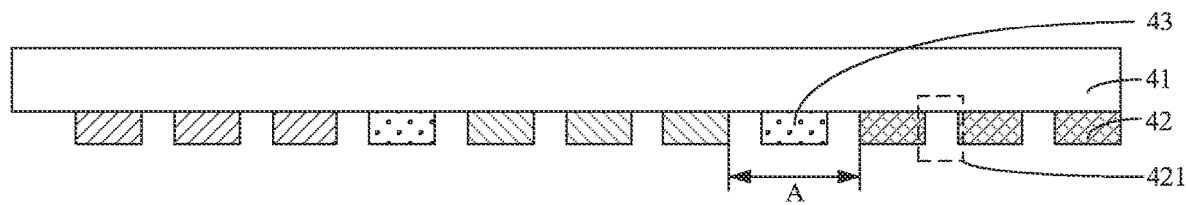
FIG. 3 is a diagram of a color filter according to a first embodiment of the present invention.

Please refer to FIG. 3. FIG. 3 is a diagram of a color filter according to a first embodiment of the present invention.

The color filter 40 comprises a substrate 41, color resistors 42, and a light blocking layer 43. The color resistors 42 are periodically arranged on the substrate 41 and adjacent two color resistors 42 have an interval A. The light blocking layer 43 is placed in the interval A. A transparent structure 421 is placed on each of the color resistors 42.

The substrate 41 is a transparent substrate and thus does not block the incident light or outgoing light. The light blocking layer 42 is a black matrix for isolating color resistors of different colors to avoid the mixed color effect. Due to the transparent structure 421, the ambient light could have lower loss when the light pass through the color resistor 42 of the color filter 40.

In this embodiment, the color filter comprises a substrate, color filters and a light blocking layer. The color resistors are periodically arranged on the substrate and have an interval between adjacent color resistors. The light blocking layer is placed in the interval. A transparent structure is placed on each of the color resistors. This could reduce the transmission loss of the light and thus raises the incident/outgoing light efficiency.

The transparent structure 421 comprises a via 4211 on the color resistor 42. The via is formed by opening a hole on the color resistor 42 from its side close to the substrate 41. The via extends along the direction of the substrate 41 and passes through the color resistor 42.

In order to reduce the transmission loss when the light passes through the color filter 40, the via 4211 could be arranged on the color resistors 42. In this way, the light could pass through the via 4211 between the color resistors 42 without passing through the color resistors 42 when the light passes through the color filter 40. Therefore, the via should be formed by opening a hole on the color resistor 42 from its side close to the substrate 41. The via extends along the direction of the substrate 41 and passes through the color resistor 42. Accordingly, the transmission loss of the light could be reduced and the incident/outgoing light efficiency could be raised.

Figure 4:
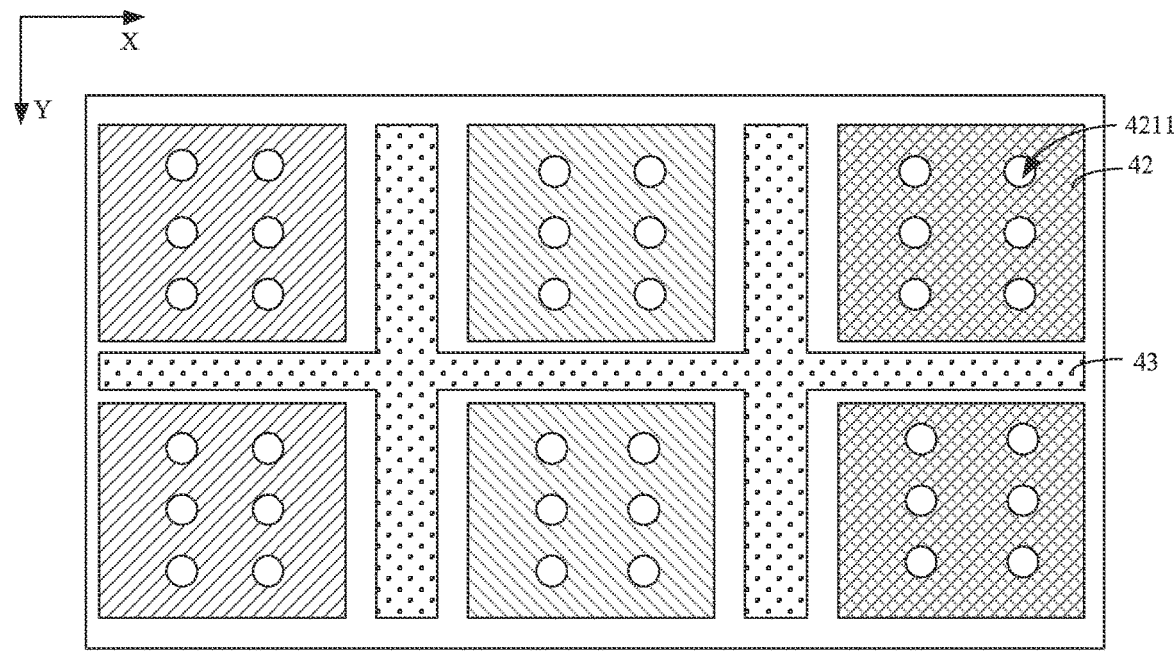
FIG. 4 is a diagram of a color filter according to a second embodiment of the present invention.

Please refer to FIG. 4. FIG. 4 is a diagram of a color filter according to a second embodiment of the present invention. The via 4211 comprises a plurality of sub-vias. The sub-vias are periodically arranged on the color filter along a predetermined direction.

In order to further reduce the transmission loss of light, multiple sub-vias could be arranged on the color resistor. In addition, in order to ensure the outgoing light equality from each of the color resistors, the sub-vias could be arranged along a predetermined direction. The predetermined direction could be the Y-axis positive direction or the Y-axis negative direction as shown in FIG. 4.

Figure 5:
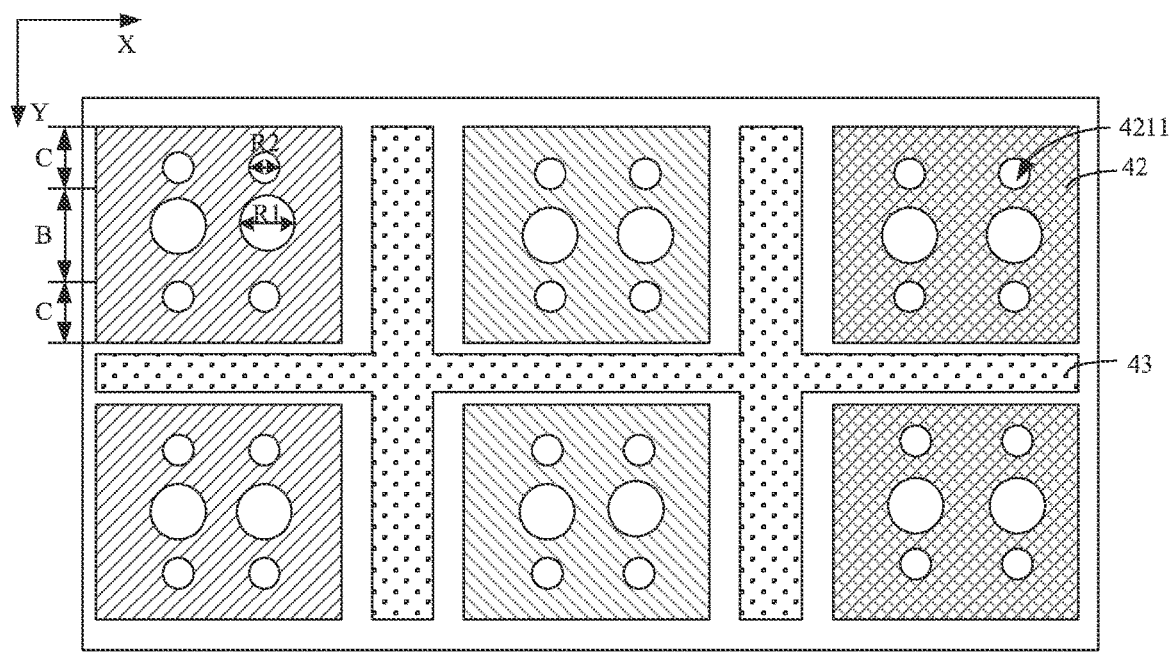
FIG. 5 is a diagram of a color filter according to a third embodiment of the present invention.

Please refer to FIG. 5. FIG. 5 is a diagram of a color filter according to a third embodiment of the present invention. Here, the color resistor 42 comprises a center region B and a non-center region C.

The diameter R1 of the sub-vias in the center region B is greater than the diameter R2 of the sub-vias in the non-center region C.

In order to further reduce the transmission loss of light, the center region B, where more light passes through, could have the sub-vias having a greater diameter R1. The non-center region C, which does not have much incident light, could have the sub-vias having a smaller diameter R2.

Figure 6:
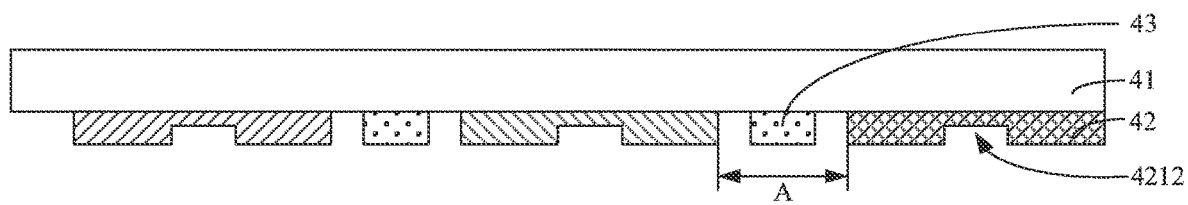
FIG. 6 is a diagram of a color filter according to a fourth embodiment of the present invention.

Please refer to FIG. 6. FIG. 6 is a diagram of a color filter according to a fourth embodiment of the present invention. The transparent structure 421 comprises a first blind via 4212 arranged on the color resistor 42. The first blind via 4212 is formed by opening a hole on the color resistor 42 from its side comparatively far away from the substrate 41. The first blind via extends along the direction of the substrate 41.

If the white light remains its color if the white light does not pass through the color resistor 42, the blind via is adopted to reduce the thickness of the color resistor 42 and also reduce the transmission loss of light. The blind via could be formed by opening a hole on the color resistor 42 from its side comparatively far away from the substrate 41. The first blind via extends along the direction of the substrate 41.

Figure 7:
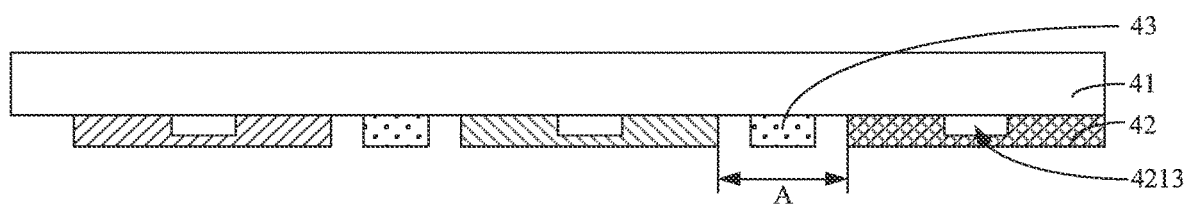
FIG. 7 is a diagram of a color filter according to a fifth embodiment of the present invention.

Please refer to FIG. 7. FIG. 7 is a diagram of a color filter according to a fifth embodiment of the present invention. Here, the transparent structure 421 further comprises a second blind via 4213 on the color resistor 42. The second blind via 4213 is formed by opening a hole on the color resistor 42 from its side close to the substrate 41. The second blind via extends along a direction away from the substrate 41.

Accordingly, the blind vias could be an upward concave blind via or a downward concave blind via on the color resistor 42. These blind vias could reduce the thickness of the color resistor 42 and thus reduce the transmission loss of light.

Figure 8:
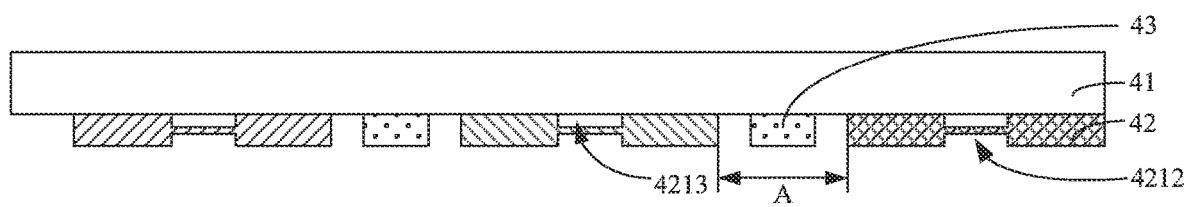
FIG. 8 is a diagram of a color filter according to a sixth embodiment of the present invention.

Please refer to FIG. 8. FIG. 8 is a diagram of a color filter according to a sixth embodiment of the present invention. In some embodiments, the first blind via 4212 and the second blind via 4213 are coaxial and the sum of the first depth of the first blind via 4212 and the second depth of the second blind via 4213 is less than a thickness of the color filter 42.

For the ambient light to enter or for the light from the backlight module to output, the two sides of the color resistor could both have an opening, the first blind via 4121 and the second blind via 4213 are correspondingly arranged and extend to the inside of the color resistor. Furthermore, in order to prevent from leaking the white light, the sum of the first depth of the first blind via 4212 and the second depth of the second blind via 4213 could be less than the thickness of the color resistor 42. This could prevent the color resistor 42 from having any via and thus could prevent the white light from passing through the via without changing its color.

Figure 9:
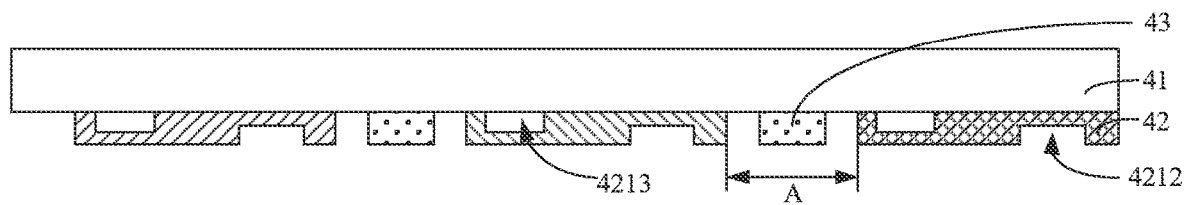
FIG. 9 is a diagram of a color filter according to a seventh embodiment of the present invention.

Please refer to FIG. 9. FIG. 9 is a diagram of a color filter according to a seventh embodiment of the present invention. Here, the first blind via 4212 and the second blind via 4213 are dislocated to each other. The first depth of the first blind via 4212 and a second depth of the second blind via 4213 are both greater than half of a thickness of the color filter 42.

In order to reduce the transmission loss of light when the ambient light is incident or when the light from the backlight module is outgoing, the holes could be opened on different locations of the color resistor. That is, the first blind via 4212 and the second blind via 4213 could be dislocated to each other and extend to the inside of the color resistor. Furthermore, the first depth of the first blind via 4212 and the second depth of the second blind via 4213 are both greater than half of a thickness of the color filter 42. This could further reduce the thickness of the color filter 42 and reduces the transmission loss.

Above are embodiments of the present invention, which does not limit the scope of the present invention. Any modifications, equivalent replacements or improvements within the spirit and principles of the embodiment described above should be covered by the protected scope of the invention.

While the embodiments of the present disclosure have been shown and described above, it is to be understood that the above embodiments are exemplary and are not to be construed as limiting the present disclosure. One of ordinary skill in the art may make variations, modifications, substitutions and alterations to the above embodiments within the scope of the present disclosure.

What is claimed is:

1. A color filter, comprising:
   a substrate;
   a plurality of color resistors of different colors, arranged in a matrix on the substrate, wherein two adjacent color resistors have an interval in-between; and
   a color blocking layer, placed in the interval and spaced apart from two of the plurality of color resistors to isolate the plurality of color resistors;
   wherein a transparent structure is placed on each of the color resistors.

2. The color filter of claim 1, wherein the transparent structure comprises a via on the color filters, the via is formed by opening at least one hole on the color resistor from a side close to the substrate, and the via extends along a direction of the substrate and pass through the color resistor.

3. The color filter of claim 2, wherein the via comprises a plurality of sub-vias, periodically positioned along a predetermined direction on the color resistor.

4. The color filter of claim 3, wherein the color resistor comprises a center region and a non-center region; and a diameter of a sub-via in the center region is greater than a diameter of a sub-via in the non-center region.

5. The color filter of claim 1, wherein the transparent structure comprises a first blind via positioned on the color resistor, the first blind via is formed by opening a hole on the color resistor from a side away from the substrate, and the first blind via extends along a direction of the substrate.

6. The color filter of claim 5, wherein the transparent structure further comprises a second blind via, the second blind via is formed by opening a hole on the color resistor from a side close to the substrate, and the second blind via extends along a direction away from the substrate.

7. The color filter of claim 6 wherein the first blind via and the second blind via are coaxial and a sum of a first depth of the first blind via and a second depth of the second blind via is less than a thickness of the color filter.

8. The color filter of claim 6, wherein the first blind via and the second blind via are dislocated to each other, and a first depth of the first blind via and a second depth of the second blind via are both greater than half of a thickness of the color filter.

9. A display panel, comprising:
   a display substrate;
   a reflection layer;
   a liquid crystal layer;
   a polarizer; and
   a color filter, comprising:
     a substrate;
     a plurality of color resistors of different colors, arranged in a matrix on the substrate, wherein two adjacent color resistors have an interval in-between; and
     a color blocking layer, placed in the interval and spaced apart from two of the plurality of color resistors to isolate the plurality of color resistors;
   wherein a transparent structure is placed on each of the color resistors;
   wherein the display substrate, the reflection layer, the liquid crystal layer, the color filter and the polarizer are stacked from the bottom top.

10. The display panel of claim 9, wherein the transparent structure comprises a via on the color filters, the via is formed by opening at least one hole on the color resistor from a side close to the substrate, and the via extends along a direction of the substrate and pass through the color resistor.

11. The display panel of claim 10, wherein the via comprises a plurality of sub-vias, periodically positioned along a predetermined direction on the color resistor.

12. The display panel of claim 11, wherein the color resistor comprises a center region and a non-center region; and a diameter of a sub-via in the center region is greater than a diameter of a sub-via in the non-center region.

13. The display panel of claim 12, wherein the transparent structure comprises a first blind via positioned on the color resistor, the first blind via is formed by opening a hole on the color resistor from a side away from the substrate, and the first blind via extends along a direction of the substrate.

14. The display panel of claim 13, wherein the transparent structure further comprises a second blind via, the second blind via is formed by opening a hole on the color resistor from a side close to the substrate, and the second blind via extends along a direction away from the substrate.

15. The display panel of claim 14, wherein the first blind via and the second blind via are coaxial and a sum of a first depth of the first blind via and a second depth of the second blind via is less than a thickness of the color filter.

16. The display panel of claim 14, wherein the first blind via and the second blind via are dislocated to each other, and a first depth of the first blind via and a second depth of the second blind via are both greater than half of a thickness of the color filter.

17. A display device, comprising:
   a shell; and
   a display panel, comprising:
     a display substrate;
     a reflection layer;
     a liquid crystal layer;
     a polarizer; and
     a color filter, comprising:
       a substrate;
       a plurality of color resistors of different colors, arranged in a matrix on the substrate, wherein two adjacent color resistors have an interval in-between; and
       a color blocking layer, placed in the interval and spaced apart from two of the plurality of color resistors to isolate the plurality of color resistors;
     wherein a transparent structure is placed on each of the color resistors;
     wherein the display substrate, the reflection layer, the liquid crystal layer, the color filter and the polarizer are stacked from the bottom top;
   wherein the display panel is positioned on the shell.

18. The display device of claim 17, wherein the transparent structure comprises a via on the color filters, the via is formed by opening at least one hole on the color resistor from a side close to the substrate, and the via extends along a direction of the substrate and pass through the color resistor.

19. The display device of claim 18, wherein the via comprises a plurality of sub-vias, periodically positioned along a predetermined direction on the color resistor.

20. The display device of claim 19, wherein the color resistor comprises a center region and a non-center region;

and a diameter of a sub-via in the center region is greater than a diameter of a sub-via in the non-center region.

\* \* \* \* \*